Figure 1:
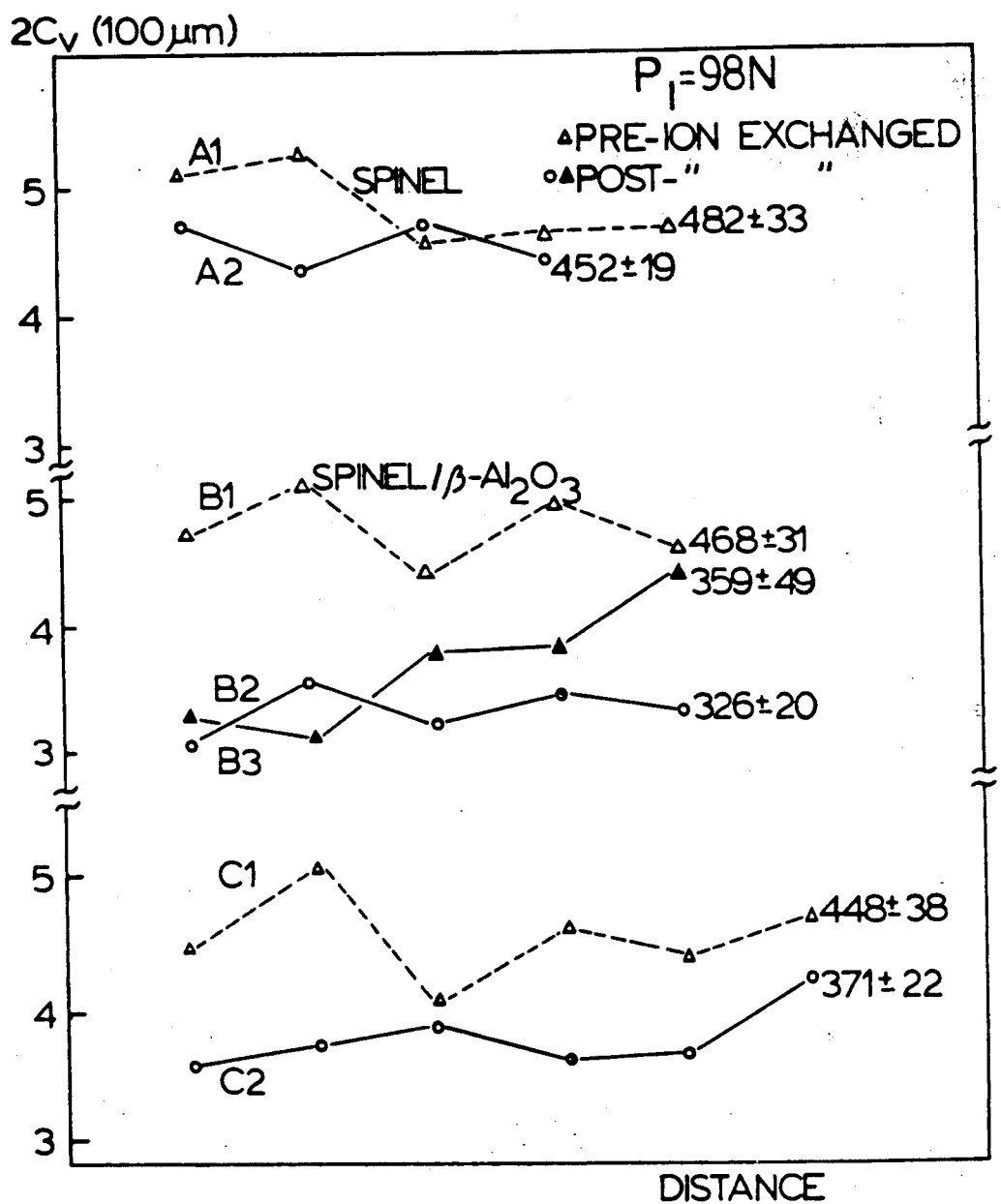

United States Patent [19]

Nicholson et al.

[11] Patent Number: 5,047,374
[45] Date of Patent: Sep. 10, 1991

[54] SURFACE STRENGTHENED COMPOSITE CERAMIC MATERIAL

[75] Inventors: Patrick S. Nicholson, Ancaster, Canada; Fred F. Lange, Santa Barbara, Calif.; Thomas Troczynski, Ancaster, Canada

[73] Assignee: McMaster University, Hamilton, Canada

[21] Appl. No.: 186,998

[22] Filed: Apr. 27, 1988

[51] Int. Cl.$^5$ .............................................. C04B 35/10
[52] U.S. Cl. .................................... 501/127; 501/32; 501/120; 501/153
[58] Field of Search ................. 501/127, 32, 120, 153

[56] References Cited

FOREIGN PATENT DOCUMENTS 60-141688 7/1985 Japan .................................. 501/127

Primary Examiner—William R. Dixon, Jr.
Assistant Examiner—David M. Brunsman
Attorney, Agent, or Firm—Arne I. Fors

[57] ABSTRACT

A surface-strengthened composite ceramic material has a ceramic matrix and a refractory phase dispersed at least in and close to the surface of the matrix. The refractory phase includes beta-alumina particles in which larger cations producing a larger molar volume replace sufficient smaller cations in beta-alumina particles in and close to the surface of the composite ceramic material to cause compressive surface stresses which increase the surface strength of the composite ceramic material. The smaller cations are replaced by the larger cations after firing of the composite ceramic material.

9 Claims, 4 Drawing Sheets

SURFACE STRENGTHENED COMPOSITE CERAMIC MATERIAL

This invention relates to the surface strengthening of composite ceramic material by the introduction of compressive surface stresses.

It is known that the surface strength of composite ceramic material can be improved by the introduction of compressive surface stresses. In the prior art, this has been achieved for example by the dispersion of tetragonal zirconia particles throughout a ceramic matrix to form a composite ceramic material, and inducing a crystallographic phase change from tetragonal to monoclinic in zirconia particles in the surface of the composite ceramic material. This produces a volume increase which in turn causes compressive stresses in the surface which strengthen the surface.

U.S. patent application Ser. No. 857,355 filed Aug. 30, 1986 (Nicholson et al) discloses that a ceramic matrix can be toughened by incorporating a refractory therein, one example being the dispersion of sodium beta-aluminum ($Na$-$\beta$-$Al_2O_3$) in a partially stabilized zirconia matrix, the zirconia being partially stabilized by a small percentage (for example about 8%) of yttria. This prior patent application also discloses that the interfacial chemistry of the beta-aluminum/ceramic matrix system can be manipulated by ion-exchange of the beta-alumina before the composite is fired. The contents of said application are hereby incorporated herein by reference. The present invention s based on the discovery that a composite ceramic material comprising a ceramic matrix and a refractory phase comprising beat-alumina particles dispersed at least in and close to the surface of the matrix can be strengthened by producing compressive surface stresses after firing by ion-exchange in which sufficient cations in beta-alumina particles in or close to the composite surface are replaced by larger cations which produce a larger molar volume to cause compressive surface stresses in the surface.

The beta-alumina may comprise sodium beta-alumina, and potassium cations may replace sodium cations in sodium beta-alumina particles in and close to the surface of the ceramic matrix. The ceramic matrix may for example comprise glass or may comprise spinel.

The ion-exchange may be effected by immersing the composite ceramic material in a liquid or gas medium containing the larger cations. When the larger cations comprise potassium cations, the ion-exchange may be effected by immersing the composite material in a molten potassium salt such as potassium nitrate.

Usually, the composite ceramic material will contain beta-alumina in an amount in the range of from about 10 to about 30% by volume. The ceramic material in powder form may comprise ceramic particles having a size in the range of from about 1 to about 10 microns and the beta-alumina particles may have a size in the range of from about 1 to about 50 microns.

According to a preferred embodiment of the invention, sodium beta-alumina in block form is ground and sieved to obtain particles of suitable size, preferably between 38 and 45 microns (400 and 325 mesh). The resultant powder is then mixed with the ceramic material (in similarly sized powder form), for an appropriate length of time to ensure adequate mixing. Preferably, the sodium beta-alumina is present in an amount in the range of from about 10 to about 30% by volume of the mixture. The powder mixture is then compacted under sufficient pressure to form pellets, and the pellets are sintered or hot pressed for an appropriate length of time at an elevated temperature to form a composite ceramic material comprising a ceramic matrix with the refractory, namely sodium beta-alumina, dispersed throughout. Such preparation of the composite ceramic material is described in more detail in the copending application of Nicholoson et al referred in earlier.

To carry out an ion-exchange step in accordance with this preferred embodiment of the invention, the pellets are preferably heated to an elevate temperature and then placed in a bath containing a molten salt of a larger cation, for example potassium nitrate, the preheat temperature being commensurate with the temperature of the molten salt, which for potassium nitrate is about 450° C.

The pellets are immersed in the bath for an appropriate length of time to effect ion-exchange in the surface of the pellets. The depth to which ion-exchange take place n the surface is determined to some extent by the immersion time. For example, an immersion time of 4 min. may produce ion-exchange to a depth of about 30 $\mu$m. At the end of the desired immersion time, the pellets are removed from the bath and allowed to cool gradually.

The invention can be applied to any ceramic material which is inert towards, i.e. does not react with, beta-aluminum or the ion-exchange agent.

As specific examples of the invention, spinel ($Mg_2Al_2O_4$) and glass were chosen as ceramic materials, the glass being 100% soda-line-silica ground container glass ($-270$ mesh). Spinel was chosen in view of its structural resemblance to sodium beta-alumina (Na-Beta-$Al_2O_3$) which consists of spinel "blocks" with intervening alkali ion containing (i.e. sodium ion containing) planes. Glass was chosen because it was a model brittle matrix and also because it itself exhibits some increased surface strength due to ion exchange when the ion-exchange step of the present invention is carried out to effect ion-exchange in the sodium beta-alumina.

Block sodium beta-alumina was ground and sieved to obtain particles between 38 and 45 microns (400 and 325 mesh). Spinel in powder form was mixed with sodium beta-alumina powder in relative amounts to produce a mixture containing 20% by volume sodium beta-alumina. Mixing was carried out in a vibromil for one hour, and the mixture was then molded and isopressed to 350 MPa to form pellets. The pellets were sintered for 5 hrs. at 1550° C. to form composite pellets comprising a spinel matrix with sodium beta-alumina dispersed throughout. After cooling, the composite pellets were cut and polished on one micron diamond. For comparison purposes in tests to be described later, spinel only pellets (i.e. without incorporation of sodium beta-alumina) was formed in the same manner.

Some of the pellets, both composite pellets and spinel only pellets, were preheated to 450° C. for 0.5 hr. and then placed in a molten potassium nitrate bath at 450° C. for 4 min. to effect ion-exchange in the surface of the pellets. Ion-exchange was effected to a depth of 30 $\mu$m. The pellets were then furnace cooled outside the bath, and then ultrasonically cleaned in water and methyl alcohol for 1 min.

The procedure was repeated using glass instead of spinel to produce composite pellets and glass only pellets, some of which were subjected to the ion-exchange procedure.

It is believed that the length of a surface crack produced by an indenter pyramid is indicative of the presence of compressive surface stresses. Accordingly, indentation tests were carried out using a Zwick harness testing machine using a Vickers pyramid on the various different pellets whose production was described above. The length of the resultant four cracks emanating from the corners of the pyramid traces on the pellets were measured immediately after indentation, and the average crack length (2 $C_v$) for each indentation was compiled for comparison purposes.

Care was taken to avoid any size effects caused by variations in the properties or treatment of the material. For example, in some cases indentation tests were carried out on a pre-ion-exchange specimen, the specimen was then subjected to ion-exchange treatment, and indentation tests were again carried out, the latter indenon tests being carried out along lines close to but not overlapping the lines of the previous indentation tests. In other cases, the pre- and post-ion-exchange specimens were represented by two matching halves of the same pellet. In these cases, both halves were subjected to the same treatment, except for the ion-exchange treatment.

The same indentation machine and load was used for pre- and post-ion-exchange specimens. The load was 98N for the spinel and spinel composite pellets, 14.7N for the glass pellets and 39.2N for the glass composite pellets. With the ion-exchanged glass only and glass composite pellets, the indentation tests were repeated after removing the surface layer in steps by gentle polishing, namely steps of 18, 12, 38 and 67 microns.

Figure 2:
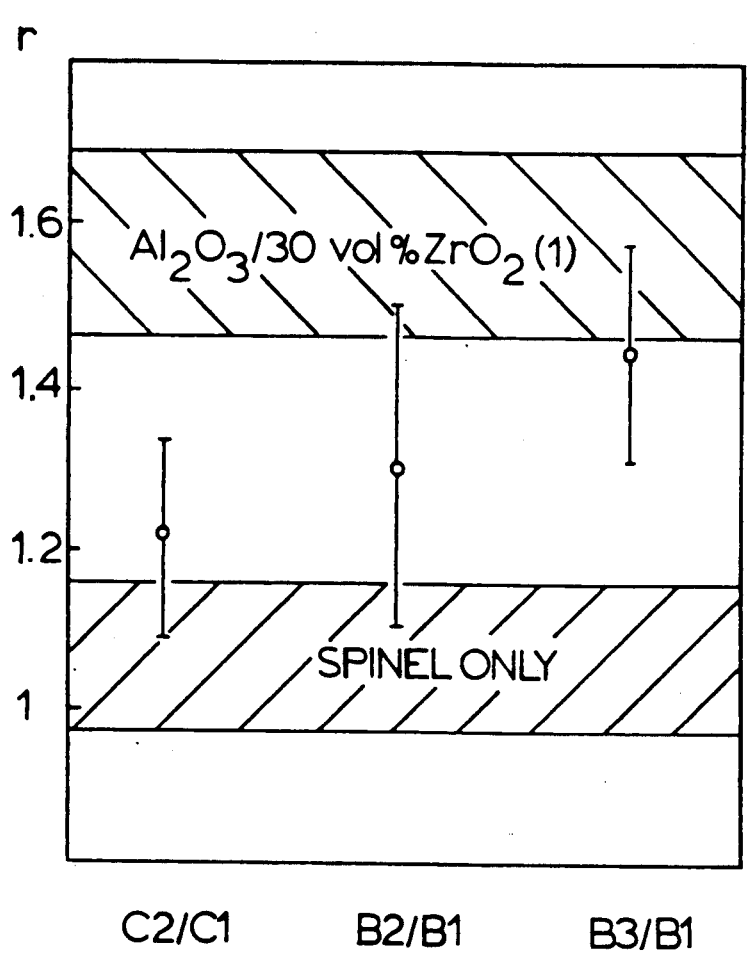
Figure 3:
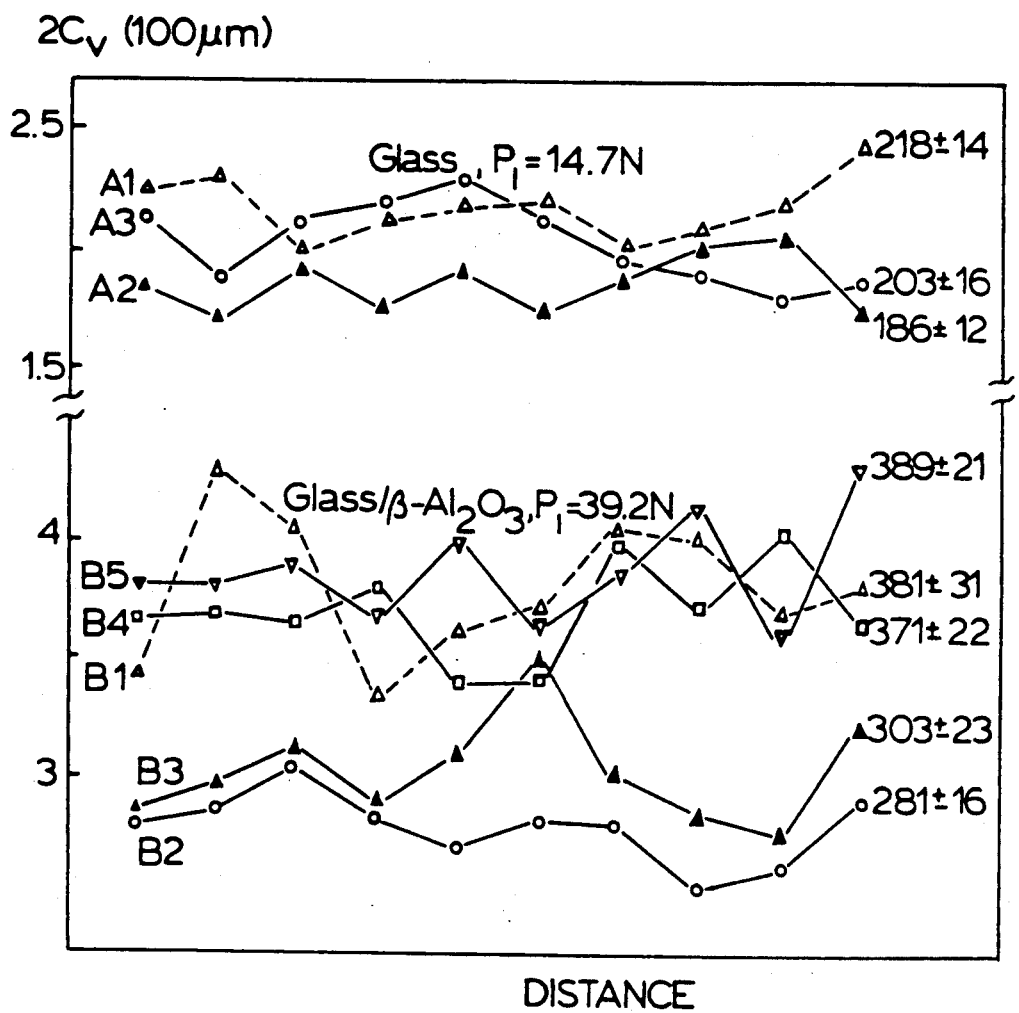
Figure 4:
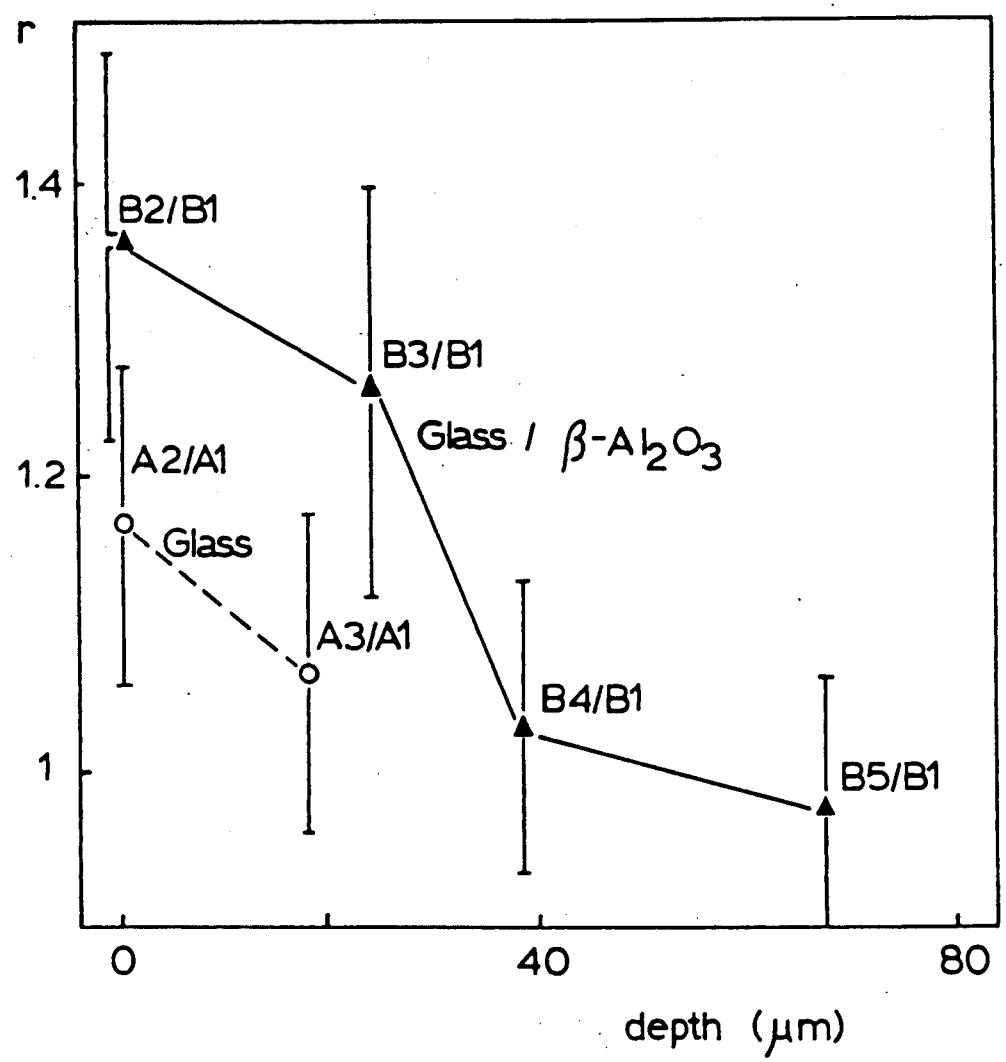

Results of the various tests are shown in the accompanying drawings, in which:

FIG. 1 shows test results for spinel only, spinel only ion-exchanged, spinel composite and spinel composite ion-exchanged specimens, FIG. 2 shows a comparison of spinel composite and spinel only test results for test results obtained with pre- and post-phase changed composite material comprising zirconia dispersed throughout an $Al_2O_3$ matrix, FIG. 3 shows test results for glass only, glass only ion-exchanged, glass composite and glass composite ion-exchanged specimens, and FIG. 4 shows test results for the glass materials at various depths below the original surface.

Referring first to FIG. 1, the Vickers crack size ($2C_v$) at various points along a test line on a specimen is plotted against distance in arbitrary units. The crack size in pre-ion-exchanged specimens is represented by open symbols and dashed lines, and the crack size in post-ion exchange specimens is represented by closed symbols and continuous lines. The number at the end of each line is the average length in microns of all the indentation cracks in the test line together with the standard deviation thereof.

Lines A1 and A2 for the pre- and post-ion-exchanged spinel-only specimens respectively overlap within the confidence limits for the average crack size, i.e. there is no significant difference between the pre- and post-ion-exchanged specimens.

With the spinel composite specimens, line B1 shows results for the pre-ion-exchanged spinel composite, and lines B2, B3 show the results, after ion-exchange, on two test lines on opposite sides of line B1 along which measurements were made before ion-exchange. Lines B2 and B3 show shorter indentation cracks after ion-exchange treatment, thereby indicating improved surface strength. Line C1 shows results for a pre-ion-exchanged spinel composite specimen, and line C2 shows results for a matching surface of the post-ion-exchanged spinel composite specimen. It will be noted that line C2 shows similar results to lines B2 and B3. The results shown in FIG. 1 were compared with data found in the literature with respect to tests carried out on specimens of a composite ceramic material comprising $Al_2O_3$ with partially stabilized zirconia dispersed therein, the test being carried out with pre-phase changed and post-phase changed zirconia. The comparative results are shown in FIG. 2. For such material, the ratio r of the average crack size on the pre-treated surface to the average crack size on the post-treatment surface was calculated.

The data for the $Al_2O_3$—$ZrO$ material was taken from the following publication:

1. D. J. Green, F. F. Lange and M. R. James, "Residual Surface Stresses in $Al_2O_3$—$ZrO$ Composites", pp. 240-250 in Advance in Ceramics, Vol.12, ed., N. Clausen, M. Ruhle and A. Heuer, The American Ceramic Soc. Inc., Columbus, Ohio, 1984.

The lower band in FIG. 2 represents the scatter of the results from spinel only compiled from lines A1, A2 in FIG. 1. The upper band represents the scatter of results obtained for $Al_2O_3ZrO$ as reported in the above mentioned literature, the tests having been carried out under similar conditions, i.e. Vickers indentation by 98N load.

The vertical lines represent the scatter of the results from spinel composite specimens compiled from lines C2, C1, B2, B1 and B3, B1 respectively of FIG. 1.

It will be seen that r is greater than 1 for the spinel composite specimens.

The intervals for the spinel only and spinel composite specimens overlap possibly because of the small number of specimens tested.

It will be seen that surface ion-exchange of the dispersed Na—B—$Al_2O_3$ particles in the spinel results in reduced crack growth similar to that induced by the phase transformation of $ZrO_2$ in the $Al_2O_3$. There are advantages in dispersing Na—B—$Al_2O_3$ over $ZrO_2$ in brittle ceramic matrixes, The size and location (inter- or intra-granular) of the Na—B—$Al_2O_3$ is stable over a wider range of temperature and costs considerably less than $ZrO_2$.

With the glass articles, and referring to FIG. 3, line A1 shows an average crack size for pre-ion-exchange glass only of 218±14 microns, and line A2 shows a decrease to 186±14 microns after ion-exchange. Line A3 shows the results when 18 microns was polished from the surface of the ion-exchanged specimen, and shows an average crack size of 203±16 microns, i.e. substantially the same as the pre-ion-exchange glass only results of lines A1 (i.e. within the standard deviation confidence intervals). This indicates that potassium ions had not significantly penetrated to this depth with the ion-exchange treatment carried out at 450° C. for 4 min.

The test results for the glass composite in FIG. 3 show a large scatter due to the inhomogeneity of the material. However, average crack size of 389±21 microns shown in line B1 for the pre-ion-exchanged surface decreased to 281±16 microns shown in line B2 for the post-ion exchanged surface. This increased to 303 microns (line B3) after removal of 23 microns shown in line B2 for the post-ion exchanged surface. This increased to 303 microns (line B3) after removal of 23 microns of surface layer, to 371 microns (line B4) after 38 microns of surface layer was removed, and to 381 microns after 68 microns of surface layer were removed.

In FIG. 4, the results are shown in terms of r value, i.e. ratio of average crack size before ion-exchange to average crack size after ion-exchange. The ion-exchange effect for the glass composite is significantly larger than for glass only. It will be noted that significant ion-exchange effect disappears at a depth of about 40 microns, which is approximately the size of the sodium beta-alumina particles utilized. It may therefore be that the ion-exchange provides compressive surface stresses to a depth controlled by beta-alumina particle size.

The advantages of the invention will be clear from the foregoing description of preferred embodiments and examples.

The ceramic matrix may be an amorphous glass material the glass previously specifically referred to, or may be a crystalline ceramic material such as spinel previously referred to, zirconia (partially stabilised by yttria), uranium oxide, boron nitride, tungsten carbide or sphene.

The beta-alumina with smaller cations may for example be lithium beta-alumina where appropriate instead of sodium beta-alumina. Also, where appropriate, instead of potassium cations, the large cations may be rubidium, calcium, copper, manganese, or caesium.

It is also within the scope of the invention to form a green ceramic shape, coat this shape with a layer of mixed ceramic plus sodium beta-alumina powders, fire the resultant composite, and then ion-exchange the exposed sodium beta-alumina to introduce larger cations in place of the sodium. It is also within the scope of the invention to incorporate beta-alumina particles throughout a ceramic matrix as described in U.S. patent application Ser. No. 857,355 referred to earlier, ion-exchange the sodium or other cation by a larger cation before firing, and then after firing ion-exchange the larger cations in and close to the surface with still larger cations to cause compressive surface stresses in the composite.

Ion exchange will be effected at elevated temperatures sufficient to cause ion-exchange but insufficient to anneal or stress relative the ceramic matrix. Molten salt media, where the salt is of the larger cation, are preferred.

Other embodiments will be readily apparent to a person skilled in the art, the scope of the invention being defined in the appended claims.

I claim:

1. A surface-strengthened composite ceramic material comprising a ceramic matrix, a refractory phase disbursed at least in and close to the surface of said matrix, said refractory phase comprising beta-alumina particles in the range of 10% to 30% by volume of the ceramic material, in which larger cations producing a larger molar volume replace sufficient smaller cations in beta-alumina particles in and close to the surface of the composite ceramic material to cause compressive surface stresses which increase the surface strength of the composite ceramic material, said smaller cations having been replaced by the larger cations after firing of the composite ceramic material.

2. A composite ceramic material according to claim 1 wherein the beta-alumina with smaller cations comprises sodium beta-alumina.

3. A composite ceramic material according to claim 2 wherein the beta-alumina with smaller cations comprises sodium beta-alumina and potassium cations replace sodium cations in sodium beta-alumina particles in and close to the surface of the ceramic matrix.

4. A composite ceramic material according to claim 1 wherein the ceramic matrix comprises spinel.

5. A composite ceramic material according to claim 4 wherein the beta-alumina with smaller cations comprises sodium beta-alumina.

6. A composite ceramic material according to claim 5 wherein potassium cations replace sodium cations in sodium beta-alumina particles in and close to the surface of the spinel matrix.

7. A composite ceramic material according to claim 1 wherein the ceramic matrix comprises glass.

8. A composite ceramic material according to claim 7 wherein the beta-alumina with smaller cations comprises sodium beta-alumina.

9. A composite ceramic material according to claim 8 wherein potassium ions replace sodium ions in sodium beta-alumina particles in and close to the surface of the glass matrix.

* * * * *